Nov. 29, 1966  A. A. LA CHIUSA  3,287,989
AUTOMATIC TRANSMISSION AND CONTROL
Original Filed Aug. 1, 1962  4 Sheets-Sheet 1
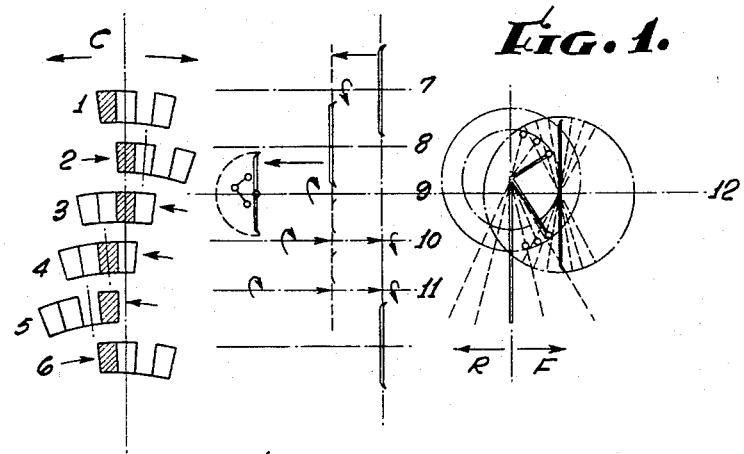
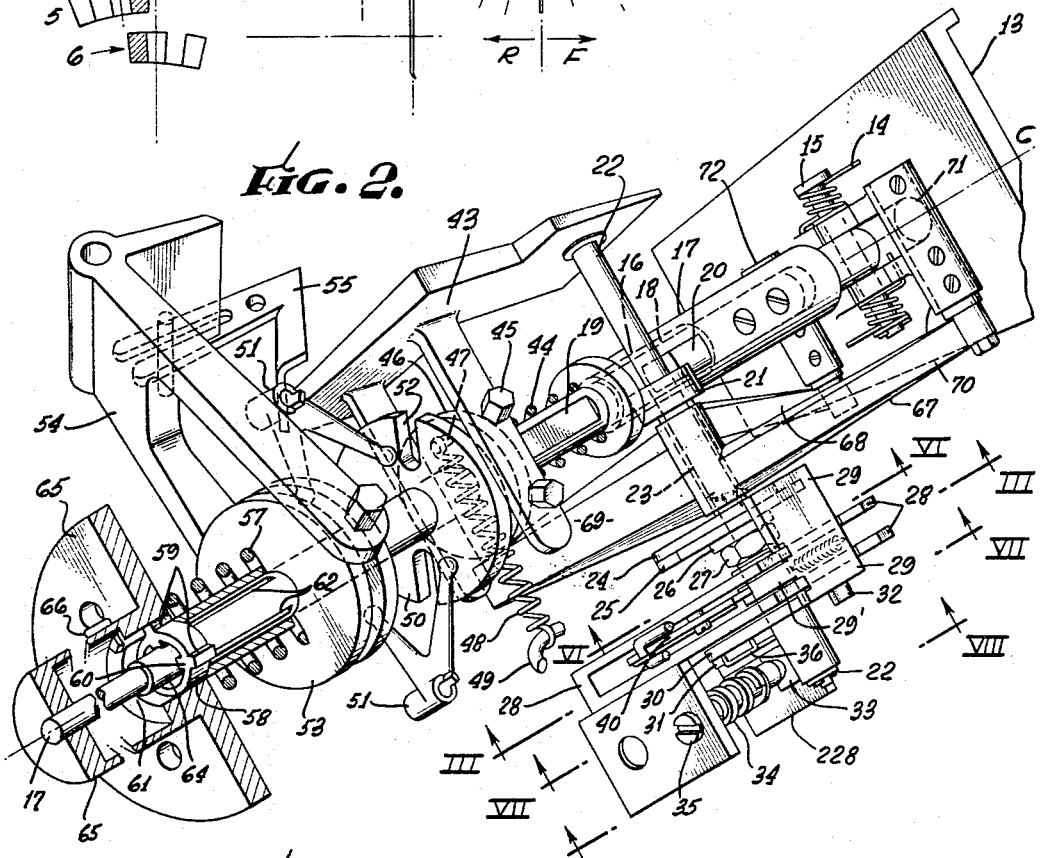
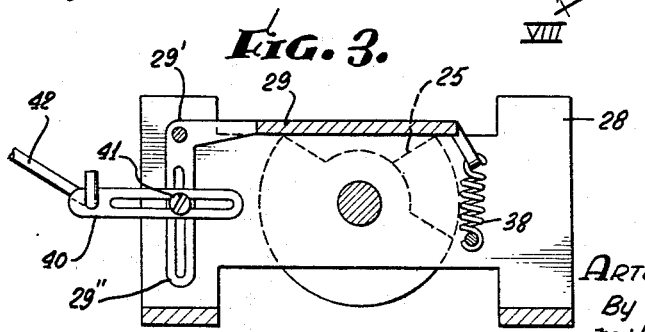
INVENTOR.
ARTURO ALFREDO LA CHIUSA
By
Miketta, Glenny, Poms & Smith
ATTORNEYS.

INVENTOR
ARTURO ALFREDO LA CHIUSA
By Miketta, Glenny, Pindar & Smith
ATTORNEYS.

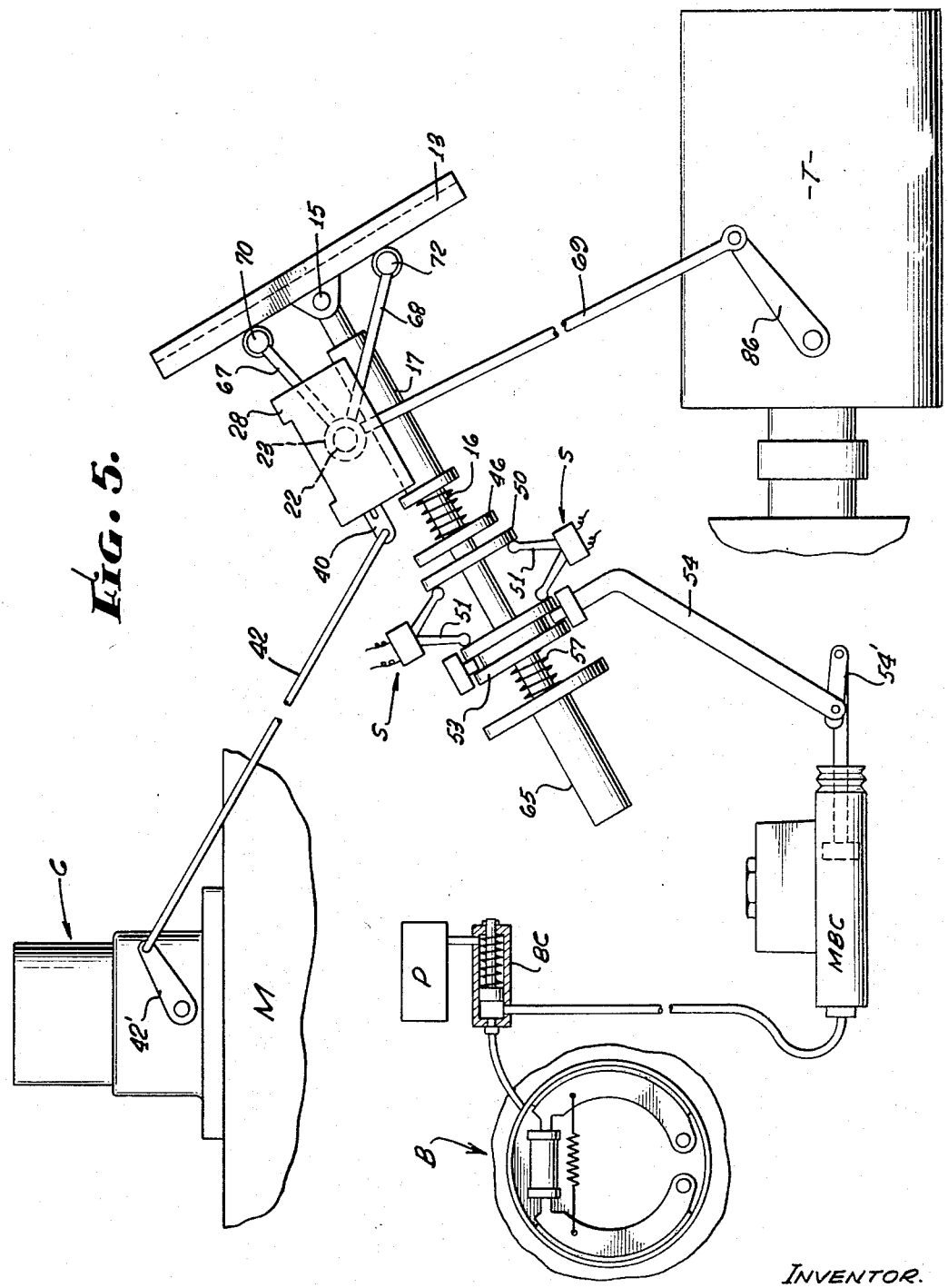

Nov. 29, 1966 A. A. LA CHIUSA 3,287,989
AUTOMATIC TRANSMISSION AND CONTROL
Original Filed Aug. 1, 1962 4 Sheets-Sheet 4
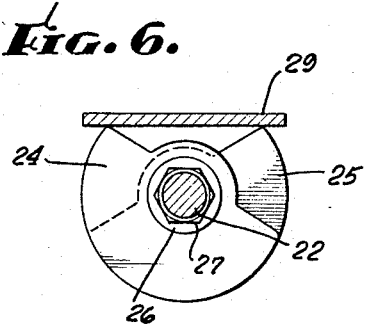
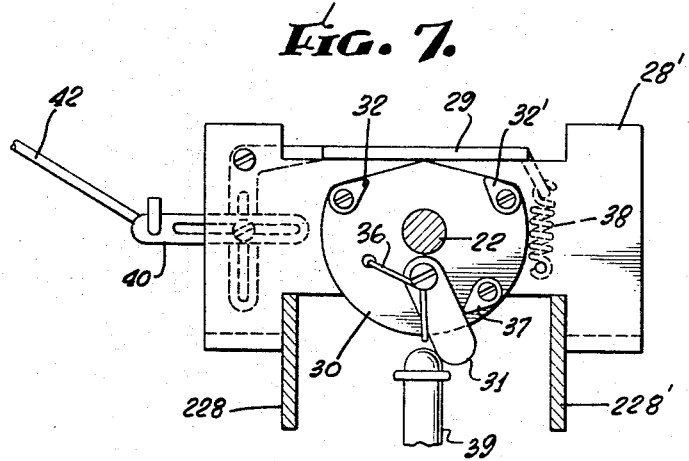
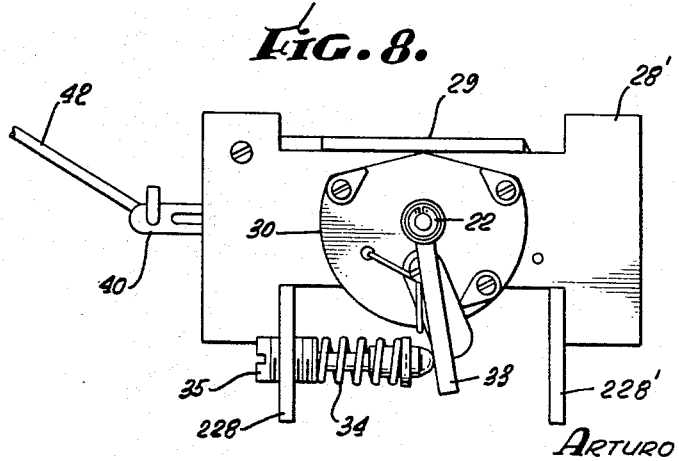
INVENTOR.
ARTURO ALFREDO LA CHIUSA
BY Miketta, Glenny, Pome & Smith
ATTORNEYS.

United States Patent Office 3,287,989
Patented Nov. 29, 1966

3,287,989
AUTOMATIC TRANSMISSION AND CONTROL
Arturo Alfredo La Chiusa, 1721 W. 67th St.,
Los Angeles, Calif.
Original application Aug. 1, 1962, Ser. No. 215,479, now Patent No. 3,205,683, dated Sept. 14, 1965. Divided and this application Mar. 1, 1965, Ser. No. 435,871
3 Claims. (Cl. 74—330)

This invention relates in general to an automatic transmission and an interrelated foot operated control device for synchronously operating the transmission and an associated motor means. More particularly, the invention relates to a novel form of automatic transmission having a transmission shaft coaxial with the differential, a universal block including interposed progressively operated gear elements and a novel mechanism coaxial to the transmission shaft and operated by the universal block to drive the differential; novel means for progressively operating the gear elements of the universal block and synchonously operating a clutch mechanism; and a foot operated control means for selectively operating the transmission and clutch mechanisms, and associated brake mechanism and associated motor means by way of longitudinal, pivotal and rotative movement of a foot pedal.

This application is a divisional application of my copending application, Serial No. 215,479, filed August 1, 1962, entitled Automatic Transmission and Control, now Patent No. 3,205,683, granted Sept. 14, 1965, and is a continuation-in-part of my prior application, Serial No. 84,817, filed Jan. 25, 1961, now abandoned, which was co-pending with my aforesaid application, Serial No. 215,479.

It is an object of this invention to disclose and provide an automatic transmission having a coaxial transmission shaft and differential with the transmission shaft having means for receiving power from a universal block including interposed progressively operable gear elements selectively driven by the manipulation of a single lever and the synchronous operation of clutch means and motor means by such lever.

It is another object of the invention to provide and disclose a combination of foot operated control device and transmission wherein the operation of a single foot pedal can control the functions of the transmission, motor means and interposed clutch means. It is a further object of the invention to disclose and provide a novel combination of foot operated control device and automatic transmission for use in automobiles and the like wherein manipulation of a single foot control by the operator controls the functions of the automobile transmission, clutch, brake and the motor, so that the operator need only manually operate the steering mechanism and a single foot pedal.

It is a still further object of the invention to disclose and provide a foot operated control device adapted to give command movements to various servo-mechanisms through pivotal, rotative and vertical operation of the foot pedal.

Generally stated, the invention contemplates the provision of a foot operated control device having a primary control shaft disposed for longitudinal and rotative motion with a foot pedal pivotally mounted on an upper end of the shaft. When employed in an automobile, the primary shaft may extend through the floorboards and be provided with an accelerator pedal pivotally mounted on the upper end. The pedal may then be pivoted, rotated or depressed to give various commands to associated mechanical elements or servo-mechanisms. One such element or servo-mechanism may be provided as a brake control means associated with the control shaft such that longitudinal movement of the primary shaft actuates the brake control means which in turn applies or releases the brake means of the automobile or machine in relation to the longitudinal disposition of the shaft which also may be termed the vertical disposition of the foot pedal. Another such control element or servo-mechanism may be a transmission control means adapted to selectively operate simultaneously the clutch and transmission gears of the motor vehicle or machine in response to pivotal movement of the pedal. It is contemplated that initial depression of the foot pedal causing a downward longitudinal movement of the main shaft may release brake means and bring the foot pedal into contact with the transmission control means, independent of the primary shaft, which can then be operated by pivotal movement of the pedal. A forward pivot of the top portion of the pedal, for instance, may serve to engage the clutch means and select a particular forward gear of the transmission mechanism. A pivot by the heel of the operator against the foot pedal may be employed to simultaneously operate the clutch and a reverse gear of the mechanism to allow rearward or reverse movement of the motor vehicle or machine. The motor means of the automobile or machine may similarly be operated by the foot control. The starter may be activated and the carburetor adjusted to an idle setting by an initial depression of the foot pedal by providing means associated between the starter and carburetor and the primary shaft for effecting such starting and warming up of the motor upon an initial depression of the pedal. Such carburetor control means may also be independently associated with the foot pedal when depressed beyond such initial depression such that pivotal movement of the pedal, which operates the transmission and clutch as aforementioned, will further operate the carburetor to accelerate the speed of the motor and maintain it at selectable driving or cruising speeds. In addition, it is contemplated that an emergency application of the brake means of the automobile or machine can be effected by adapting the aforementioned brake control means to allow immediate application of the brakes of the car on a rotation of the foot pedal.

Thus, in driving the automobile or machine, the operator may start the motor and allow it to warm up at an idle speed by depressing the pedal to an initial or start position. Thereafter, further depression of the pedal will release a power brake mechanism allowing the auto or machine to be movable and to bring the pivotal pedal into contact with transmission, clutch and carburetor control means. Upon a depression of the upper portion of the pedal by the toe of the operator, the speed of the motor may be increased, the low gear selected by the transmission and the clutch mechanism engaged. Further pivotal movement of the pedal may select higher gear ratios and allow higher motor speeds. A raising of the pedal will re-apply the brakes and cause the vehicle or machine to slow to a stop. Depression of the rear portion of the pedal by the operator's heel will cause the transmission to select a reverse gear, the clutch to be engaged and the motor to accelerate.

In order to properly utilize the foot control device of my invention, I have provided a particular form of transmission and clutch mechanism which may be described in general as follows:

A novel form of transmission shaft is provided around and coaxially to a differential mechanism as employed in automobiles and similar machines. The transmission shaft has an enlarged central portion encompassing the differential with tubular parts extending outwardly therefrom and coaxially surrounding the axles driven by the differential. This transmission shaft element may be journalled in the frame of the automobile or machine to support the differential. A universal block including a plurality of interposed, independently rotatable gear elements is disposed generally at right angles to the transmission shaft. Each gear element of the universal block has internal gears adapted to be progressively engaged by an interiorly disposed and movable pinion and associated means drawing power from the clutch and motor. Axial movement of the pinion through the center of the universal block is adapted to select each of the individual gear elements to be driven. Each gear element further is provided with an external bevel gear with all such gears having their diameters lying in a single, frontal plane facing the differential and transmission shaft.

Means for transmitting power from the individual gear elements of the universal block to the transmission shaft formed coaxially about the differential are provided in the form of a plurality of axially aligned bevel gears mounted coaxial to the transmission shaft. Such axially aligned bevel gears on the transmission shaft are adapted to mesh with the bevel gears of the universal block and transmit power from the universal block to the transmission shaft and thus to the differential. Means are provided for selecting the operated bevel gears by the universal block to provide forward and reverse drive of the transmission shaft and differential.

In addition, a novel clutch actuating mechanism is provided in the form of two spaced opposed conical discs having flat or eccentric portions abutting a platform elements of the clutch mechanism. Movement of the discs about their pivot points is controlled by movement of the aforementioned pinion and associated means such that operation of the clutch is synchronized with the operation of the pinion between the various gear elements of the universal block. The disc elements are further adapted to be moved divergently of each other by an additional control lever to allow emergency disengagement of the clutch mechanism synchronously with the emergency application of the brake means as previously indicated.

In order to provide a better understanding of the invention and the inter-relationships of the various elements thereof, a detailed description thereof will be presented hereinafter. It should be noted that while various mechanical elements will be described in the exemplary embodiment, servo-mechanisms can readily replace such mechanical elements and that the following detailed description is of an exemplary embodiment only which is presented to facilitate the understanding of the invention. Reference will be made to the appended sheets of drawings in which:

FIG. 1 is a schematic representation of the functions and positions of the accelerator or foot pedal, during operation of the control device according to the invention;

FIG. 2 is a perspective view of the foot operated control device according to the invention with mechanical elements shown schematically for purposes of illustration;

FIG. 3 is a detail side view of a portion of the device of FIG. 2 taken therein along the plane III—III;

FIG. 5 is a schematic representation of the foot operated control device of FIGS. 1 through 4 associated with conventional motor and braking means;

FIG. 6 is a detail sectional view of the device of FIG. 2 taken therein along the plane VI—VI;

FIG. 7 is a detail sectional view of the device of FIG. 2 taken therein along the plane VII—VII; and FIG. 8 is a detail sectional view of the device of FIG. 2 taken therein along the plane VIII—VIII.

Figure 4:
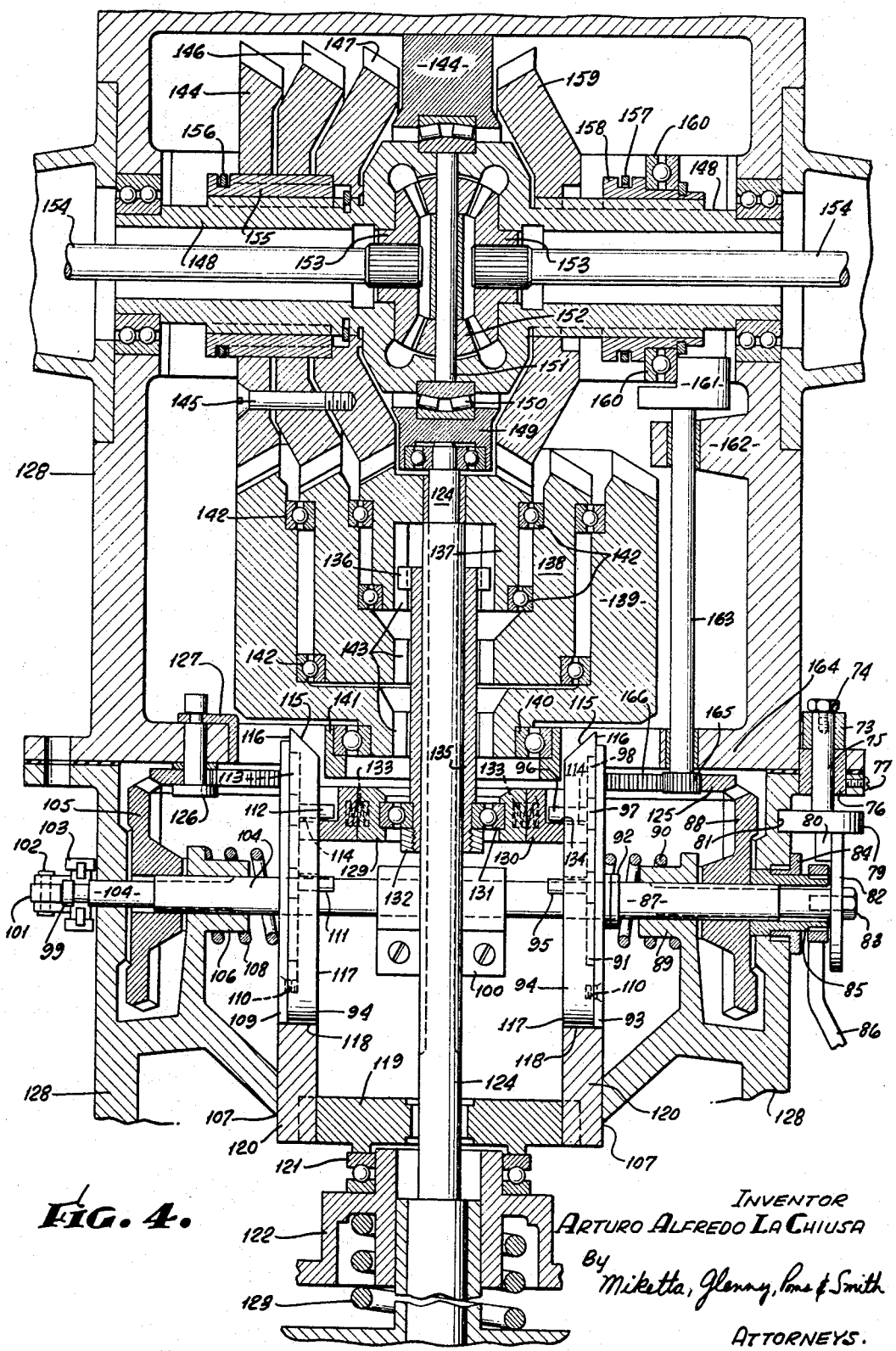
FIG. 4 is a longitudinal section of the transmission according to the invention.

Referring first to FIGS. 2 and 5, there is shown a primary shaft 17 having a pivotally mounted accelerator pedal 13 provided on its upper end. Assuming for purposes of illustration that the control device is to be mounted in an automobile, the view in FIG. 2 would be from below the floor boards, looking up at the underside of the accelerator pedal 13. Pedal 13 is mounted to shaft 17 by the pivot 15 to pivot about an axis generally perpendicular to the longitudinal extent of shaft 17. Spring 14 biases the pedal 13 into a rest position with pedal 13 lying in a plane generally perpendicular to the longitudinal axis of shaft 17. Primary shaft 17 may include an extension portion 16 mounted by internal threading 18 on shaft 17 to allow a longitudinal adjustment of the shaft length. Means are provided for mounting shaft 17 for both longitudinal and rotative movement relative to the automobile or machine employing the device. Such means may include a support 43 having two extending arms mounting a channeled disc 46 which is adapted to undergo limited movement between four guide stops 45. Disc 46 is adapted to receive shaft 17 therethrough and conforms to the flat 19 on shaft 17 so that rotation of shaft 17 is imparted to disc 46. A tangential spring 48 mounted to disc 46 at points 47 and secured to a fixed point, indicated at 49, biases disc 46 and primary shaft 17 into an initial or rest position. Rotative movement of shaft 17 by rotation of accelerator pedal 13 under movement of the operator's foot, is thus opposed by spring 48 and return of the pedal and shaft to the initial position is thereby provided. Shaft 17, however, may be freely moved longitudinally through disc 46. A vertical support 65 is provided at the bottom end of shaft 17 to provide a lower stop for the shaft. A guide bushing 58 slidably mounted on the bottom end of shaft 17 and keyed to it by provision of internal wings 60 slidably engaging longitudinal slots 62 formed in the end of shaft 17, is provided to prevent rotation of shaft 17 until it is depressed within the support 65 a predetermined amount. It can be seen that when bushing 58 leaves the three slots 61 engaged by the external wings 59 upon downward depression of shaft 17 and pedal 13, the bushing will be free to rotate in a clockwise direction, when viewed from below, until one of the exterior wings 59 abuts the stop 66. The lower end of shaft 17 is adapted to slide through the bottom opening of support 65, as shown in FIG. 2, until the enlarged portion, beginning at point 64, engages the bottom portion of the vertical support or stop 65. Such aforementioned downward movement of bushing 58 is effected upon an initial depression of shaft 17 and pedal 13 due to the abutment thereon by the bushing extension shown in FIG. 2 between bushing 58 and a shaft mounted disc 53.

Brake control means are provided in association with the primary or control shaft 17 for operating brake means indicated generally at B in FIG. 5 of the automobile or machine with which the control device is to be used. Such brake means B should be adapted to be in an applied condition under normal circumstances as by a hydraulic brake cylinder BC holding brake B locked by hydraulic pressure from a source P of hydraulic pressure, such that actuation of the brake control means by the present foot-operated control device causes a temporary release of the brake means during operation of the vehicle or machine as by means of a master brake cylinder MBC adapted to release the brake cylinder means BC. The brake control means may include a servo-mechanism operated by the control shaft or a mechanical element as hereinafter described. As shown in FIGS. 2 and 5, a disc 53 is coaxially mounted upon the control shaft 17 and mounts a control lever 54 secured to a channel in the disc 53 by appropriate bolt means threaded through the arms of lever 54. The disc 53 is biased by spring means 57 such that resistance to downward longitudinal movement of shaft 17 and pedal 13 is provided. Upon a depression of the pedal 13 overcoming the bias of spring means 57, lever 54 may actuate the associated brake means, as through a link 54' attached to the piston rod of the master brake cylinder MBC, to a released position to allow the vehicle or machine to be operated.

Means may be provided for powered operation of disc 53 upon depression of pedal 13 in order to overcome high resistance to movement of lever 54 by the brake means of the automobile or machine. In such case, disc 53 is adapted to slide upon the shaft 17 against the spring bias of spring 57. A control plate 50 is fixedly mounted on shaft 17 above the disc 53 and power amplification means may be interposed between the discs. Such power amplification means may be provided in the form of a servo-mechanism, indicated schematically in FIG. 5 generally at S, having arms, indicated at 51, adapted to abut the two discs. Thus, depression of shaft 17 by pedal 13 will cause the control disc 50 to move the upper arms of arms 51 downward and the associated servo-mechanisms S to exert a higher force upon the disc 53 moving lever 54. Disc 50 is preferably provided with two opposed radial cuts, as shown in FIG. 2, such that in case of an emergency, counterclockwise movement of pedal 13, when viewed from below, will align the radial slots 52 in disc 50 with the upper arms of servo-levers 51 allowing immediate release of disc 53 and a reapplication of the brake means without a retraction of the pedal and primary shaft.

Carburetor control means are provided in association with the primary shaft whereby an initial downward longitudinal movement of the shaft and accelerator pedal will start the associated motor M and operate the carburetor C to a motor idling setting, as shown in FIG. 5. The carburetor control means is further associated with the accelerator pedal after such initial depression is effected whereby pivotal movement of the pedal may operate the carburetor to further selected settings. Such carburetor control means may take the exemplary form shown in FIGS. 2, 3, 6, 7 and 8. As shown in the exemplary embodiment, such control includes two adjoining discs 24 and 25 situated on a conical prolongation of a bushing 23 which in turn is mounted on an independent shaft 22 lying generally transverse to the primary shaft 17. Transversal shaft 22 may be cantilevered from the support 43. Discs 24 and 25 are provided with cam surfaces as shown in FIG. 6 adapted to abut a lever 29 associated by linkage 40, 42 and 42' to the carburetor C. Discs 24 and 25 are adjustable radially by a washer 26 and lock nut 27 to allow adjustment of the cam surfaces engaging lever 29. Carburetor control cover 29, as shown in FIGS. 2 and 3, is pivoted at a mid-portion 29' between spaced plates 28 and 28' mounted to the shaft 22. When either cam disc 24 or 25 abuts the upper plate-like portion of lever 29, its lower end 29'' moves the associated link 40. Lever 29 is adjustably interconnected to the carburetor valve lever 42' by way of the rod 42 and link 40 adjustably mounted by said screw 41 to the lever portion 29'' as shown in FIG. 3. Bushing 23 is further provided with arms 67, 68 and 69 which make up a transmission lever supported by the transversal shaft 22 free from the rotations of shaft 22 and adapted to be actuated by pivotal movement of the pedal 13. Roller bearings 70 and 72 are joined to arms 67 and 68 respectively to facilitate the movement of the transmission lever by pivotal movement of pedal 13. When pedal 13 is depressed sufficiently far that it abuts either or both of the roller bearings 70 and 72, pivotal movement of pedal 13 about its axis 15 will cause rotation of bushing 23 and the discs 24 and 25 to control the carburetor levers 29 and 40. Movement by the toe of the operator against pedal 13 causing downward movement of bearing 70 moves disc 25 into engagement with lever 29 to operate the carburetor. Depression of pedal 13 by the heel of the operator tends to move bearing 72 downward and brings disc 24 into engagement with lever 29 to operate the carburetor. Such operation of the carburetor through lever 29 and links 40, 42 and 42' is contemplated to be effected by pivotal movement of the pedal 13 after the automobile or machine is in operation and the brake means has been released by depression of lever 54.

Means for starting the motor and setting the carburetor to an idling setting are also provided which are operated by an initial depression of the pedal 13. Convergent inclined planes forming an obstacle at 20 on shaft 17 are provided in exemplary embodiment to activate an eccentric 21 affixed to the transversal shaft 22. Thus, initial downward movement of shaft 17 will cause the transversal shaft 22 to be rotated as the obstacle 20 is moved past the eccentric 21. In the carburetor control means, supported by the support 28, a disc 30 is joined to the transversal shaft 22 to be rotated by such initial longitudinal movement of the shaft 17 and pedal 13. Disc 30 has an angular cut in the portion adjacent lever 29, as shown in FIG. 7, and is provided with two adjustable eccentric elements 32 and 32' adapted to engage the lever 29. Also, a trigger 31 is provided on plate 30 which is adapted to abut a starter button 39 upon such initial movement of the pedal to start the motor and maintain it in an idling or warm-up condition. A lockspring 36 maintains trigger 31 against an adjustable eccentric 37 to allow adjustment of trigger 31 relative to the button 39. A lever 33, as best seen in FIG. 8, may be mounted at the end of transversal shaft 22 and be spring biased by springs 34 into a rest position to return shaft 22 after the action of eccentric 21 upon shaft 22 is performed. The tension of such springs 34 may be adjusted by a guide shaft set screw 35 as shown in FIG. 2. Also, a spring 38 may be provided to bias the carburetor lever 29 into a rest or carburetor valve closed position.

From the foregoing, it may be seen that an initial depression of pedal 13 may operate the carburetor control means to start the motor and operate the carburetor to an idling or motor warm-up setting with the brake means still applied. Further depression of pedal 13 will release the brake means through the brake control means described, including disc 53 and lever 54, and will bring the pedal 13 into contact with the roller bearings 70 and 72 in order to further operate the carburetor control means by pivotal movement of the pedal. A forward tipping of the accelerator pedal will cause the carburetor control means to adjust the carburetor for a higher engine speed. In an emergency, a rapid rotation of the pedal will allow the immediate re-application of the power brake means held in a release position by the brake control means. As is further particularly contemplated within the invention, the pivotal movement of the accelerator pedal not only controls the carburetor control means herein described, but operates an automatic transmission simultaneously. Such automatic transmission is shown in an exemplary embodiment in FIG. 4 and generally at T in FIG. 5. The lower arm 69 of the transmission lever or bushing 23, shown broken away in FIG. 2, may be continued to and joined with a lever 86 in the transmission. The operation of such lever 86 and the transmission will now be described with reference being made to the embodiment shown in FIG. 4.

Lever 86 in FIG. 4, is operated by the transmission control mechanism including the transmission lever 69 of FIG. 2 by the pivotal movement of pedal 13. As shown in FIG. 4, lever 86 engages a bushing element 85 adapted to receive and rotate shaft 87. Grooves shown in dotted line in FIG. 4 are provided in shaft 87 to receive splines formed on the interior of bushing 85 to allow shaft 85 to slide within the bushing 85 yet be rotated by it when lever 86 is moved. A bevel gear 88 is mounted on shaft 87 and also rotated with shaft 87 by the lever 86. Bevel gear 88 is adapted to mesh with and drive a lateral ring bevel gear 125 which in turn drives a bevel gear 105 opposed to bevel gear 88. The opposed bevel gear 105 is mounted on a shaft 104 with a spline end groove mounting as in the case of shaft 87 and gear 88. The shafts 87 and 104 are mounted on supports 89 and 106 respectively for divergent sliding movement as well as rotation along with the bevel gears. The lateral ring bevel gear 125 is supported on three interior ring supports, as support 126 mounted on the flange of transmission casing 128 by the forked guide 127. A pair of opposed eccentric conical discs 94 are mounted on the shafts 87 and 104 respectively. Each eccentric conical disc has a flat or eccentric surface 118 adapted to abut the parallelepiped arms 120 of a clutch piston control platform 119. The bearing 121 permits rotation between the clutch piston 122 and the platform 119 as well as their longitudinal forces exerted thereon. A clutch spring 123 is also shown to bias the clutch piston 122 in a clutch disengaged position. It may be seen from the foregoing that a movement of lever 86 will cause a rotation of shaft 87 and bevel gear 88 transmitted by the ring bevel gear 125 to the bevel gear 105 and shaft 104 to cause counter rotation of the two eccentric discs 94. Such rotation of eccentric discs 94 will cause a movement of arms 120 along the guide surfaces 107 moving platform 119 and clutch piston 122 against the bias spring 123 to engage the clutch. The movement of the eccentric discs 94 also causes operation of the transmission gear mechanism as hereinafter explained.

Means are provided for disengaging the aforementioned clutch control mechanism in cases of emergency application of the brake means as hereinbefore explained. Lever 73, shown in FIG. 4, may be interconnected to the brake lever 54 by way of an extension 55. Lever 73 is mounted on a shaft 75 by bolt 74, the shaft 75 being mounted in a bushing 76 held to the transmission case flange 78 by screw 77, to rotate a disc 79. Disc 79 rotates through a guide slot 81 located in the transmission case and mounts eccentrically a point 80. Rotation of disc 79 moves the eccentrically mounted point 80 against a disc 82 fixed to the end of shaft 87 by a bolt 83 to cause an outward sliding of shaft 87 through the bevel gear 88 and bushing 85. Such outward movement of shaft 87 causes the associated disc 94 to move to the right in FIG. 4 against the urging of the spring 90 interposed between such disc and the support 89. A fork 91 is held to the rear of such disc on the shaft 87 by a cover 93 screwed to the eccentric disc by screws 100. A depending arm 92 fixed to the fork 91 engages a lower rod 99 slidably held in a support 100. Rod 99 extends to the left side of the transmission case, as shown in FIG. 4, where it engages an angular lever 101 mounted on a pivot 102. Lever 101 is joined to a fork 103 joined to the shaft 104 such that the aforementioned movement of rod 87 under the urging of the eccentrically mounted point 80 is transmitted to the opposed eccentric disc through the lower rod 99 and lever 101 to provide a divergent movement of the two discs. Each conical disc 94 includes a conical lift surface 115 with an outside large disc base 116 and an inside small disc base 117. When the eccentric discs 94 have been rotated by movement of arm 86 to cause engagement of the clutch means, a turning of arm 73 will cause a divergent movement of the discs 94 such that the arms 120, rather than engaging the outer base 116, will move to a closed position engaging the inner disc base 117.

Each eccentric conical disc 94 is provided with two cylindrical projections 95, 96 and 111, 112 respectively. In the eccentric disc 94 on shaft 87, the cylinders 95 and 96 slide in a radial slot 114 with the head portion of each, as head 97, moving in a slot 98. In the disc 94 on the shaft 104, the cylinders 111 and 112 slide in slot 114 while the head portions thereof, similar to head 97, slide in a slot 113. These cylinders are maintained in the aforementioned radial slots by the provision of cover plates 93 and 109 and the screws 110. Since the two opposed eccentric discs are adapted for opposite rotation, the radial slots in each are developed in opposite directions so that the cylinders may oppose each other during broad movement of the discs.

A central block 129 disposed between the eccentric discs 94 has two extendible parts 130 and is mounted on a bearing 131 held by a nut 132 to a pinion bushing 135. Pinion bushing 135 is slidably mounted by a spline and groove connection to the secondary shaft 124 operated by the clutch means. Spring means 133 provided in the extendible parts 130 keep the central block 129 in contact with the internal surfaces of the eccentric discs corresponding to the small bases 117 thereof. Such two extendible parts 130 have transverse slots 134 that accept the cylinders 96 and 112. Such radial slots as previously described on the eccentric conic discs permit the discs to engage the clutch before dragging the cylinders 96 and 112 to push the central block in a longitudinal movement along the secondary shaft 124. Such longitudinal movement of the pinion bushing 135 may be adapted to control the positioning of a pinion 136 within a universal block, as hereinafter described, to facilitate the progressive engagements of the pinion with the various gear elements for the plurality of forward speeds of the transmission. Cylinders 95 and 111 are provided to impart a reverse movement to the pinion bushing 135 by engagement of the outer sides of the extendible portions 130 of the central block 129. The foregoing pinion mounting and driving mechanism for providing axial movement of the pinion within the universal block and the clutch means for engaging and disengaging the pinion mounting and driving means with a motor means are exemplary only and it is contemplated that any similarly operating mechanism may be employed within the invention.

A universal block is provided including a plurality of interposed independently rotatable gear elements to be progressively engaged by the pinion 136. Gear elements 137, 138 and 139 are each provided with interior bevel gears 143 that are aligned to and spaced along a common axis to be progressively engaged by the axially movable pinion 136. Each such gear element 137, 138 and 139 is further provided with an external bevel gear, as shown in FIG. 4, such that the bevel gears so formed lie in a single frontal plane facing generally perpendicularly to the longitudinal extent of the differential and associated transmission mechanisms. Gear element 37 functions as a reverse and low gear and is located at the end of the secondary shaft 124 which is free to rotate within it. Further support is provided to gear element 137 by the bearings 142 disposed between gears 137 and 138. Gear element 138 is in turn interposed between the gear elements 137 and 139 with support coming from the associated bearings 142. Gear 139 has external bearing 140 located in support 141 which in turn is mounted on the interior of the transmission case flange 128. The last two gear elements 138 and 139 correspond to the gear ratios of second and third such that three gear ratios are provided by the universal block which are selectable progressively by movement of the pinion 136.

A differential block is provided including pinions 152 mounted on pivot bar 151 and side gears 153 mounting axles 154. A tubular transmission shaft 148 is provided surrounding and supporting the differential block. Pivot bar 151 extends from the differential block into the enlarged central section of the tubular, coaxially provided transmission shaft 148 such that rotation of the transmission shaft is imparted to the differential. Transmission shaft 148 is mounted upon a central bearing 150 located on a central support 149 joined to the transmission case 128 and a pair of outboard bearings mounting outer portions of the tubular transmission shaft 148 to the transmission case as shown in FIG. 4.

A transmission shaft actuating mechanism is provided coaxial to the transmission shaft 148 to transmit power from the universal block to the transmission shaft 148. Such means may include a plurality of axially aligned bevel gears 144, 146, 147 and 159 adapted to mesh with the external bevel gears of the aforementioned universal block. As shown in the exemplary embodiment, bushing 155 is slidably mounted upon the left-hand portion of the tubular transmission shaft 148 and is adapted to rotate with it by a groove and spline connection. Similarly, an exteriorly formed spline is adapted to make with interior grooves in the bevel gears 144, 146 and 147. The bevel gears 144, 146 and 147 are united by a screw 145 to rotate in unison and will turn the transmission shaft 148 when the bushing 155 is in operable position as shown in FIG. 4. On the opposite side of the differential the reverse bevel gear 159 may be activated by sliding movement of the bushing 158 along the tubular transmission shaft 148 similarly as described with relation to the bushing 155. Bushings 155 and 158 are interconnected by a lower lateral rod slidably mounted to the central support 149 and engaging a fork 156 upon bushing 155 and a fork 157 upon bushing 158. A reverse movement of lever 86 due to heel pressure of the operator's foot upon the pedal 13 will cause the bevel gear 88 to rotate in a reverse direction to that previously described and cause the internal teeth sector 166 of ring bevel gear 125 to rotate a gear 165 on shaft 163. Shaft 163 is guided on supports 162 and 164 and is provided at its opposite end with an eccentric disc 161. Eccentric disc 161 is adapted to abut a bearing 160 rotatively mounting the bushing 158. Thus, rotation of eccentric disc 161 will cause the rotatable bushing 158 to engage reverse gear 159 with transmission shaft 148 and to disengage the forward speeds gearing, 144, 146 and 147, from the transmission shaft 148. The gear 159, engages internal universal block gear 137 to cause a reverse drive of the differential.

With reference to the drawings and to the control mechanisms, 1, 2, 3, 4, 5 and 6, indicate respectively the movements of the primary shaft 17 directed by the accelerator pedal 13, as seen frontally. The lined section represents one of the three interior wings 59 of the pinion bushing 58 which comprises the guide element of the coaxial control mechanism of the brake lever 55. The open section is one of the three longitudinal slots 62 formed in the end of the primary shaft 17. The left to right arrows are the movement of the tangential spring 48. The right to left arrows are the rotative movements applied by the pedal 13.

The letter "C" is the inoperative position of the primary shaft, in a static position with the brakes applied; at 2 in a static position with the brakes disengaged; at 3 in an appropriate position for the preliminary phases before starting and in preparation for motion; at 4 in a rotational movement for the immediate action of the brakes in case of emergency; at 5 in a rotational movement appropriate for the slow action of the lever on the brakes; at 6 in a position same as 1 at 7, 8, 9, 10 and 11, respectively, the same movements are shown for pedal 13 as the foregoing in their correlative lateral positions with the longitudinal movements of the primary shaft 17 at 12, the radial movements applied by the pedal 13 are shown as applied to the transmission lever made up of three arms 67, 68, 69.

The letter "R" indicates the extent of action of the arm 69 of the transmission lever relative to reverse. The letter "F" indicates the extent of action of the arm 69 of the transmission lever relative to forward speeds.

From the foregoing it may be seen that the foot operated control device according to the invention is adapted to operate the transmission levers 86 and 73 by simple pivotal and rotative movement of the accelerator pedal. The motion of the operator's foot is thus translated by the control device into command stimuli to the motor, brake and transmission mechanisms to provide an easily operable vehicle or machine universally controllable by simple foot actions. It is again noted that the previous description is of an exemplary embodiment in schematic form and that the invention may be employed in alternative embodiments and constructions employing servo-mechanisms in place of the mechanical elements described without deviating from the principles of the invention described herein.

I claim:

1. An automatic transmission and interrelated foot-operated control device for operating a motor powered apparatus comprising:
   a universal block including a plurality of interposed independently rotatable gear elements, each element having an internal gear and an external bevel gear, the internal gears being aligned to and spaced along a common axis to successively receive an axially movable pinion, the external bevel gears being formed in a single frontal plane;
   a transmission shaft adapted to coaxially surround, support and rotate a differential and associated axles;
   a transmission shaft actuating mechanism coaxial to said transmission shaft including a plurality of axially aligned bevel gears adapted to mesh with said external bevel gears of said universal block;
   a pinion;
   pinion mounting and driving means for providing movement of said pinion between said internal gears and for driving the universal block gear element associated with an internal gear aligned with said pinion;
   clutch means for engaging and disengaging said pinion mounting and driving means with a motor means;
   clutch actuating means; and
   a foot-operated control means for selectively operating said pinion mounting and driving means and said clutch means including: a primary control shaft including means for mounting said shaft for longitudinal movement; a foot-operable pedal pivotally mounted on one end of said shaft; transmission control means mounted on said shaft and associated with said pinion mounting and driving means and said clutch means whereby longitudinal movement of said shaft under urging of an operator's foot controls the engagement and disengagement of said clutch and the disposition of said pinion between said internal gears.

2. An automatic transmission comprising:
   a universal block including a pluarlity of interposed independently rotatable gear elements, each element having an internal gear and an external bevel gear, the internal gears being aligned to and spaced along a common axis, the external bevel gears being formed in a single frontal plane;
   a pinion and engagement means for providing progressive engagement of said pinion with said internal gears;
   a differential and associated axles disposed generally perpendicular to the axis of the universal block internal gears;
   a tubular transmission shaft coaxially surrounding and supporting said differential and associated axles; and
   a transmission shaft actuating mechanism coaxial to said transmission shaft and including a plurality of axially aligned bevel gears adapted to mesh with said external bevel gears of said universal block.

3. In combination with the automatic transmission of claim 2, the provision of:
   said engagement means including pinion driving means for providing movement of said pinion between said internal gears and for driving the universal block gear element associated with the internal gear aligned with said pinion.

References Cited by the Examiner

UNITED STATES PATENTS 1,130,134   3/1915   Baldwin _____ 74—330 X

DAVID J. WILLIAMOWSKY, *Primary Examiner.*

J. R. BENEFIEL, *Assistant Examiner.*